United States Patent [19]
Weiss

[11] Patent Number: 5,813,488
[45] Date of Patent: Sep. 29, 1998

[54] ELECTRIC WHEEL DRIVE FOR A UTILITY VEHICLE

[75] Inventor: Heinz Weiss, Bensheim, Germany

[73] Assignee: Deere & Company, Moline, Ill.

[21] Appl. No.: 869,875

[22] Filed: Jun. 5, 1997

[30] Foreign Application Priority Data

Jun. 14, 1996 [DE] Germany .......................... 196 23 737.8

[51] Int. Cl.[6] ................................................ B60K 1/02
[52] U.S. Cl. .......................................... 180/65.6; 180/65.1
[58] Field of Search ................................ 280/65.1, 65.2,
280/65.3, 65.4, 65.6, 65.7, 65.8; 318/140–143;
74/695, 665 F, 694, 750 R, 764, 763, 768,
769, 701, 751, 785, 301, 397, 781 R, 392,
700

[56] References Cited

U.S. PATENT DOCUMENTS

| 4,283,968 | 8/1981 | Kalns | 74/701 |
| 4,296,650 | 10/1981 | Kalns | 74/751 |
| 4,702,125 | 10/1987 | Kalns | 74/695 |
| 4,953,646 | 9/1990 | Kim . | |

FOREIGN PATENT DOCUMENTS 31 20 675 C2  11/1985  Germany .
41 08 647 A1   9/1992  Germany .

Primary Examiner—Richard M. Camby

[57] ABSTRACT

A wheel drive for agricultural or industrial utility vehicles includes an electric motor with an output shaft which drives a final drive gearbox that reduces the rotational speed of the driven wheel. A transmission gearset is arranged between the electric motor and the final drive gearbox, and can be shifted between at least two rotational speed transmission ratios. The wheel drive permits attainment of a wide range of vehicle speeds with the use of low cost commercially available electric motors. The design speed of the electric motor corresponds with the principal operating speed of the vehicle and relatively high vehicle speeds are possible.

6 Claims, 2 Drawing Sheets

ELECTRIC WHEEL DRIVE FOR A UTILITY VEHICLE

BACKGROUND OF THE INVENTION

This invention relates to a final drive gear in a hub of a driven wheel which reduces a high hub input speed to a lower wheel speed.

Wheel drives of this type are described in German Patent DE-A 41 08 647 and U.S. Pat. No. 4,953,646. The electric energy for the electric motors for wheel drives is generated by an engine-driven generator. A number of components required for conventional mechanical drivelines, such as the drive clutch, synchronizer arrangements, creeper gearboxes, articulated shafts and the like may be omitted. Furthermore, electric wheel drives have the advantage, in contrast to conventional mechanical drives, that very individual adjustment of the power transmitted for varying drive requirements is possible. Hence, with the use of an appropriate electric motor controller, an infinitely variable setting for the rotational speed or the vehicle speed of the wheels in forward or reverse operation is possible. In addition, the drive of the wheels at differing rotational speeds and individually selected torque values is advantageous during cornering, since this can avoid vehicle stresses, reduce tire wear and improved tracking compliance.

Electric motors can be operated across a wide range of rotational speeds so that the attainable vehicle speed covers a broad range. Since the operating range of electric motors is restricted, that is the ratio of maximum speed to design speed is limited, for example to a value of 6, more modest maximum speed requirements must be considered in the design, and higher rotational speeds may have to be restricted. In utility vehicles this design criterion may collide with the requirement that the design speed of the electric motor should correspond with the speed of the vehicle in the principal operating range, in which the maximum power output is required. Agricultural tractors, for example, must produce their maximum power output during plowing, that is, at vehicle speeds about 7 km/h. Therefore, the design speed of the electric motor should correspond with the vehicle speed during plowing. The corresponding design speed, however, limits the maximum speed of the vehicle.

SUMMARY OF THE INVENTION

Accordingly, an object of this invention is to provide an electric wheel drive of the aforementioned class by means of which the noted problems are overcome.

In particular, an object is to provide a wheel drive which can use a low cost commercially available electric motor.

A further object is to provide a wheel drive which attains a large speed range for the vehicle, where the design speed of the electric motor corresponds to the principal operating range of the vehicle and relatively high vehicle speeds are possible.

These and other objects are achieved by an electric wheel drive wherein a further gearset is arranged between the electric motor and the final drive gearbox which can be shifted between at least two rotational speed ratios and in at least one rotational speed ratio the output speed of the electric motor is reduced or increased. By this means the speed range of the wheel drive can be broadened additionally. In particular, the design speed of the electric motor can be established essentially independent of the desired maximum speed of the vehicle.

In order to make possible shifting even under high power loading, it is advantageous to provide a gearset that can be shifted under load for the further gearset. For this purpose planetary gear sets are appropriate, in particular those that contain a Ravigneaux gearset. The planetary gearset can most appropriately be shifted by the use of clutches and/or brakes.

In order to minimize transmission losses that occur in transmission gearsets, it is advantageous to configure one of the transmission speed ratios of the transmission gearset as direct drive in which there is no change in rotational speed. In at least one other transmission rotational speed ratio the rotational speed of the electric motor is reduced or increased. Most appropriately the direct drive is provided for the vehicle speed range in which the maximum power is usually required, and which is used for the design speed of the electric motor.

Preferably the rotational speed ratios of the two transmission speed ratios are in the ratio 1:3. This means, for example, that if the one speed ratio delivers a direct drive, the output speed of the other ratio is increased or decreased by a factor of three.

An electric wheel drive is particularly appropriate for the wheels of a steerable front axle of a utility vehicle. On the one hand here the arrangement of a relatively costly mechanical power transmission from the internal combustion engine to the front axle can be avoided. On the other hand this arrangement permits the attainment of a relatively favorable total overall efficiency for the vehicle, since generally a smaller proportion of the total power requirement of the vehicle is transmitted to the front axle than to the rear axle, and the rear axle is driven, as previously, mechanically or by a hybrid drive as described in the patent application submitted in parallel hereto to the German patent office with our file number case 8711.

Preferably the electric motor is an asynchronous motor, whose rotational speed can easily be adjusted between zero and a maximum rotational speed by a frequency control. Asynchronous motors are widely distributed and can be manufactured at relatively low cost.

Electric motors with high maximum rotational speed are preferred for this application, for example, 10,000 r.p.m. Here it is appropriate to employ a planetary drive with two planetary gearsets for the final drive gearbox, which delivers a large rotational speed reduction.

DETAILED DESCRIPTION

Figure 1:
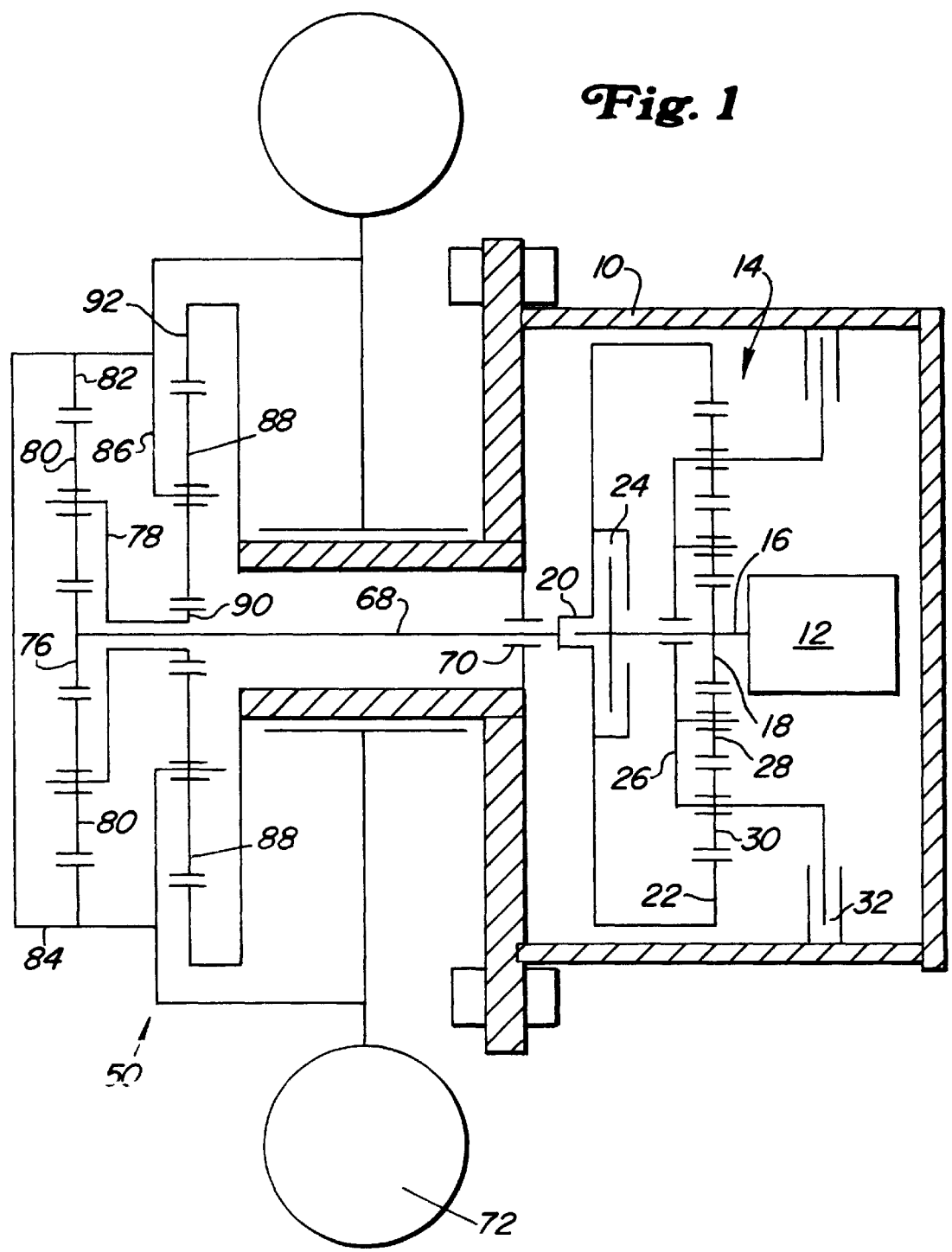
FIG. 1 is a schematic diagram of an electric wheel drive according to the invention with a shiftable planetary gearset.

FIG. 1 shows an electric wheel drive which could be used with a spring mounted, steerable front axle of an agricultural tractor. The drive includes a housing 10 which is fastened to an axle body (not shown), of a front axle (not shown). The housing 10 contains an electric motor 12 and a transmission gearset 14 that can be shifted between two drive ratios and is configured as a planetary gearset.

The output shaft 16 of the electric motor 12 carries a sun gear 18 of the planetary gearset 14 and is supported, free to rotate, at its free end in a bearing arrangement 20 of an internal gear 22. The internal gear 22 is fastened, fixed against rotation, to a connecting shaft 68. The output shaft 16 of the electric motor 12 can be connected selectively, fixed against rotation, through a clutch 24 with the internal gear 22.

A planet carrier 26 is supported in bearings, free to rotate, on the output shaft 16 of the electric motor 12. The planet carrier 26 carries several sets each of two planet pinions 28, 30 (of which only two each are shown), which mesh with each other. Each of the radially inner planet pinions 28 meshes with the sun gear 18, and each of the outer planet pinions 30 meshes with the inner planet pinion 28 as well as with the internal gear 22. The planet carrier 26 can be selectively fixed against rotation with respect to the housing 10 by a brake 32.

When the brake 32 is released and the clutch 24 is engaged in such a way that it can transmit torque, a first rotational speed transmission ratio is established. Here the internal gear 22, the planet carrier 26, the planet pinions 28, 30 rotate together with the output shaft 16 of the electric motor 12. This results in a direct drive from the output shaft 16 of the electric motor 12 to the connecting shaft 68 without any change in rotational speed.

For a second rotational speed transmission ratio the clutch 24 is disengaged and the brake 32 is applied. Thereby, the planet carrier 26 is connected to the housing 10, fixed against rotation. The sun gear 18 drives the inner planet pinions 28. The inner planet pinions 28 drive the outer planet pinions 30 and these drive the internal gear 22 and thereby the connecting shaft 68. If the pitch diameter of the internal gear 22 is selected as three times the diameter of the sun gear 18 then the output rotational speed of the electric motor 12 is reduced to one-third.

The connecting shaft 68 is supported on a bearing arrangement 70 on the housing 10. It provides the energy source for a final drive gearbox 50 and carries a sun gear 76. On the connecting shaft 68 a planet carrier 78 is supported in bearings, free to rotate, whose planet pinions 80 mesh with the sun gear 76 and an internal gear 82. The internal gear 82 is arranged, fixed against rotation, in a wheel bearing housing 84 which carries a front wheel 72 of the vehicle, fixed against rotation. A further planet carrier 86 is arranged, fixed against rotation, in the wheel bearing housing 84. The planet pinions 88 of the further planet carrier 86 mesh on the one hand with a sun gear 90, which is connected, fixed against rotation, with the first named planet carrier 78, and on the other hand mesh with an internal gear 92 which is fastened, fixed against rotation, to the stationary housing 10.

The final drive gearbox 50 configured as a planetary gearset takes the rotational speed transmitted by the connecting shaft 68 and reduces it by a fixed ratio. If the gears of the planetary gearset contain the numbers of teeth corresponding to the following table, then a rotational speed reduction in the ratio 1:0.02275 is produced. The torque transmitted to the front wheel 72 is thereby correspondingly increased. Then the total rotational speed reduction for the transmission gearset 14 and the final drive gearbox 50 in the first rotational speed transmission ratio is in the ratio 1:0.02275 and in the second rotational speed transmission ratio in the ratio of 1:0.00758.

TABLE

| Gear | Number of Teeth |
| --- | --- |
| Sun gear 76 | 24 |
| Internal gear 82 | 88 |
| Sun gear 90 | 24 |
| Internal gear 92 | 164 |

With a rotational speed of the electric motor of 3,500 r.p.m., a tire radius of 0.7 meter and a rotational speed reduction in the ratio of 0.00758 (second transmission reduction ratio) the result is a vehicle speed of approximately 7 Km/h. If the electric motor rotational speed is increased to 10,000 r.p.m., the vehicle speed is raised to approximately 20 Km/h. At a motor rotational speed of 5,000 r.p.m., a tire radius of 0.7 meter and a rotational speed reduction ratio of 0.02275 (first rotational speed reduction ratio), the result is a vehicle speed of approximately 30 Km/h. By increasing the motor speed to 13,333 r.p.m. the vehicle speed can be raised to 80 Km/h.

Figure 2:
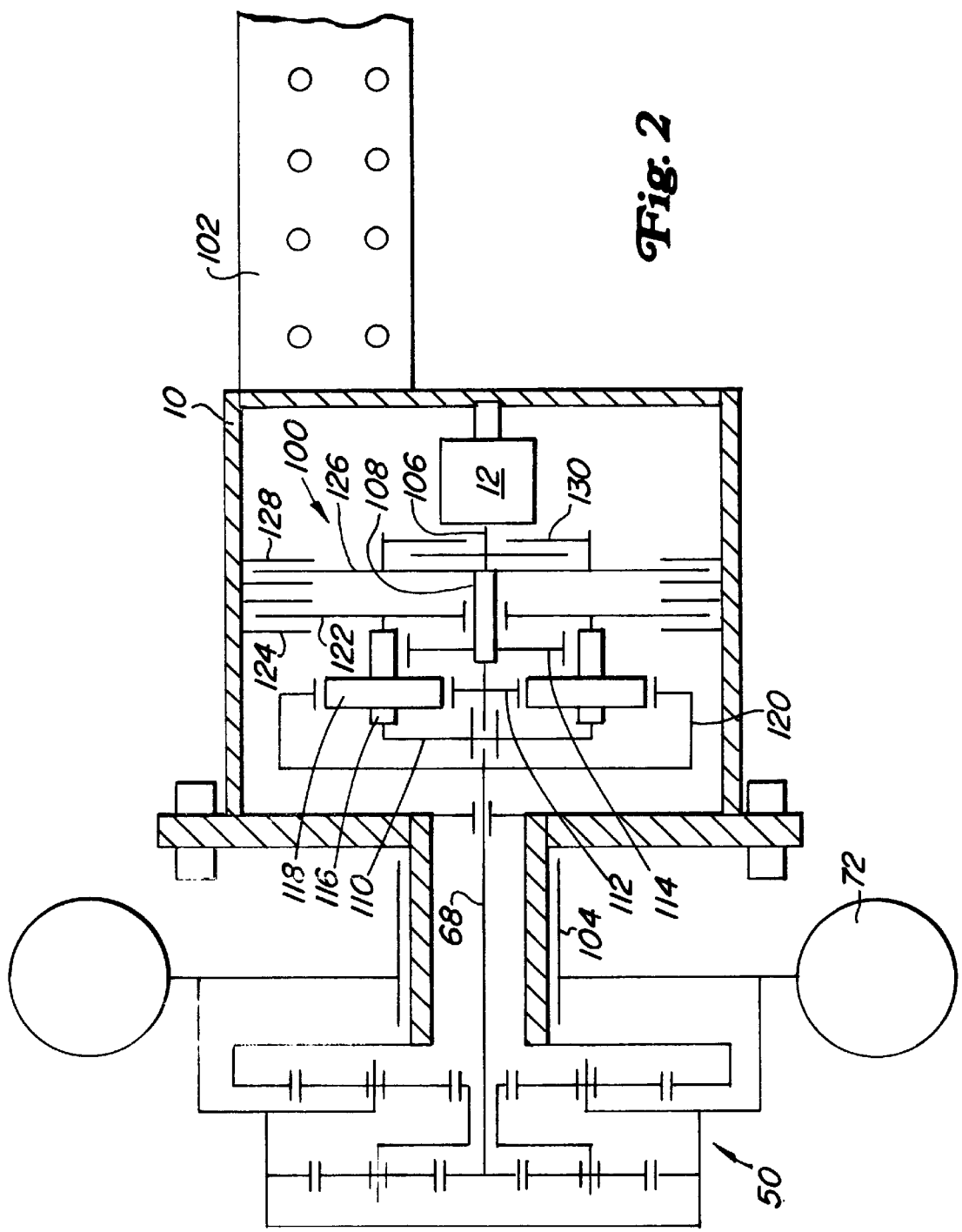
FIG. 2 is a schematic diagram of an electric wheel drive according to the invention with a Ravigneaux gearset.

FIG. 2 shows a wheel drive which differs only in the configuration of the shiftable planetary gearset from the embodiment of FIG. 1. Corresponding components are identified with the same reference numbers in both figures. The planetary gearset of FIG. 2 is a Ravigneaux gearset 100 that is accommodated in the final drive gearbox housing 10 which is fastened to the axle body 102. The axle body 102 of the rear axle engages a final drive housing 10 and is offset radially from the wheel axle which coincides with the connecting shaft 68. The front wheel 72 is supported in bearings, free to rotate, through a wheel bearing 104 on the final drive housing 10 and is driven by the electric motor 12 and the Ravigneaux gearset 100 with an intervening final drive gearbox 50 configured as a planetary gearset.

The electric motor 12 is connected to an output shaft 106 that extends in certain regions through a hollow shaft 108 that is free to rotate and whose free end is supported in bearings in a planet carrier 110 of the Ravigneaux gearset 100. The output shaft 106 carries, fixed against rotation, a first sun gear 112 of the Ravigneaux gearset 100. A second sun gear 114 of the Ravigneaux gearset 100 is mounted, fixed against rotation, on the hollow shaft 108. On the planet carrier 110 sets of long planet pinions 116 and short planet pinions 118 are arranged. For example, three planet pinion sets each may be provided, of which only two are shown. The long planet pinions 116 mesh with the second large sun gear 114 and the short planet pinions 118 mesh with the first smaller sun gear 112 as well as with an internal gear 120. Furthermore each of the long planet pinions 116 meshes with an associated short planet pinion 118.

The internal gear 120 is connected, fixed against rotation, to the connecting shaft 68 on whose one end the planet carrier 110 is supported in bearings, free to rotate. The planet carrier 110 carries, fixed against rotation, a first brake disk 122, which is supported in bearings, free to rotate, on the hollow shaft 108 and interacts with a first brake arrangement 124 that is fastened to the final drive housing 10. The hollow shaft 108 carries, fixed against rotation, a second brake disk 126, which interacts with a second brake arrangement 128 which is fastened to the final drive housing 10. Furthermore a clutch 130 is provided between the output shaft 106 and the hollow shaft 108.

The Ravigneaux gearset 100 permits a shift between two rotational speed transmission ratios.

If only the first brake 124 is applied (first gear ratio), then the planet carrier 120 drives the shaft 68 with a rotational speed that results from the ratio of the number of teeth of the first sun gear 112 and the internal gear 120 (when the planet carrier 110 is held, fixed against rotation). The long planet pinion 116, the sun gear 114 and the components of the brake 128 (brake disk 126) are now not in the power flow and rotate freely without carrying any power. The torque is transmitted from the electric motor 12 over the output shaft 106, the first sun gear 112, the short planet pinion 118, the internal gear 120 to the connecting shaft 68.

If the second brake 128 is applied in addition to the first brake (second gear ratio), then the gearset is supported as in the first gear ratio and additionally on the fixed sun gear 114 and experiences a rotational speed increase. Now all components of the Ravigneaux gearset 100 are included in the power flow.

When the clutch 130 is engaged and brakes 124, 128 released (third gear ratio) the two sun gears 112 and 114 are locked together and rotate as direct drive. The electric motor 12 drives the connecting shaft 68 through the locked Ravigneaux gearset 100 without any speed change at the output rational speed of the electric motor.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A single wheel drive for agricultural or industrial utility vehicles, each wheel being driven by a respective drive having an electric motor, with an output shaft which drives a final drive gearbox that reduces the rotational speed of the driven wheel, wherein each drive comprises:

a transmission gearset coupled between the electric motor and the final drive gearbox, the transmission gearset being capable of being shifted between at least two rotational speed transmission ratios.

2. The wheel drive of claim 1, wherein:

the transmission gearset comprises a planetary gearset which can be shifted by means of clutches and/or brakes.

3. The wheel drive of claim 1, wherein:

the transmission gearset includes a Ravigneaux gearset.

4. The wheel drive of claim 1, wherein:

in a first rotational speed transmission ratio the driven wheel is directly driven, and in a second rotational speed transmission ratio the rotational speed of the driven wheel is less than the rotation speed of the electric motor.

5. The wheel drive of claim 1, wherein:

the transmission gearset has a transmission ratio wherein the driven wheel speed is one third of the motor speed.

6. The wheel drive of claim 1, wherein:

the electric motor is an asynchronous motor.

* * * * *